United States Patent [19]

Harris

[11] 4,450,265

[45] May 22, 1984

[54] ADDITIVES FOR CYANOACRYLATE ADHESIVES

[75] Inventor: Stephen J. Harris, Dublin, Ireland

[73] Assignee: Loctite Corporation, Newington, Conn.

[21] Appl. No.: 375,140

[22] PCT Filed: Aug. 27, 1981

[86] PCT No.: PCT/GB81/00170

§ 371 Date: Apr. 28, 1982

§ 102(e) Date: Apr. 28, 1982

[87] PCT Pub. No.: WO82/00829

PCT Pub. Date: Mar. 18, 1982

[30] Foreign Application Priority Data

Aug. 28, 1980 [IE] Ireland ................................ 1812/80

[51] Int. Cl.$^3$ ............................................ C08F 120/34
[52] U.S. Cl. ..................................... 526/298; 526/204
[58] Field of Search ................................ 526/298, 204

[56] References Cited

U.S. PATENT DOCUMENTS

| | | | |
|---|---|---|---|
| 4,196,271 | 4/1980 | Yamada et al. ..................... | 525/242 |
| 4,307,216 | 12/1981 | Shiraishi et al. ..................... | 526/298 |
| 4,377,490 | 3/1983 | Shiraishi et al. ..................... | 526/298 |

*Primary Examiner*—Harry Wong, Jr.
*Attorney, Agent, or Firm*—Eugene F. Miller

[57] ABSTRACT

The invention provides an adhesive composition of the cyanoacrylate type containing Phthalic anhydride as an additive to improve the resistance to moisture and/or heat of the resulting adhesive bonds.

5 Claims, No Drawings

ADDITIVES FOR CYANOACRYLATE ADHESIVES

This invention relates to adhesive compositions containing as the major polymerisable constituent one or more esters of 2-Cyanoacrylic acid, such as Ethyl 2-cyanoacrylate.

The improvement of cyanoacrylate adhesive compositions, particularly as regards the stability of the adhesive bonds formed therewith under exposure to high temperatures and moist conditions, is an area of wide-ranging and energetic research activity. The present invention adds one compound to the list of additive substances known to improve these compositions in the said respect.

There follows a short outline of the closest prior art known to us.

1. Federal German Pat. No. 24 29 070 (1975: Bostik GmbH) discloses the use of Itaconic anhydride as an additive in alkyl and allyl cyanoacrylate compositions to impart improved heat resistance to the adhesive bonds formed.

2. Patent No. 34874 (1972: Loctite (Ireland) Limited) and its equivalent U.S. Pat. No. 3,832,334 disclose the use of Maleic anhydride and derivatives thereof as additives in alkyl cyanoacrylate compositions to impart improved heat resistance to the adhesive bonds formed.

3. Japanese Pat. No. 78 110 635 (1978: Toa Gosei) discloses the use of hydroxyalkyl and hydroxyhaloalkyl esters of $\alpha,\beta$-unsaturated carboxylic acids as additives in alkyl cyanoacrylate compositions to impart improved heat resistance to the adhesive bonds formed.

4. Japanese Pat. No. 77 80 336 (1977: Toa Gosei) discloses the use of dicarboxylic acids and their anhydrides as additives in ethyl cyanoacrylate compositions to impart improved impact resistance to the adhesive bonds formed.

5. Japanese Pat. No. 77 78 933 (1977: Toa Gosei) discloses the use of aromatic polycarboxylic acids and their anhydrides as additives in Ethyl cyanoacrylate compositions to impart improved impact resistance to the adhesive bonds formed.

The above references also provide a good indication of progress up to their respective dates in the improvement of heat and impact resistance in adhesive bonds formed from alkyl cyanoacrylate compositions by the use of additives.

The invention provides an adhesive composition comprising a polymerisable constituent the major part of which comprises at least one ester of 2-cyanoacrylic acid, characterised in that the composition additionally comprises a proportion of Phthalic anhydride effective for favourably influencing the strength and/or durability of adhesive bonds formed from said composition, under exposure to moisture or elevated temperature.

An effective proportion of Phthalic anhydride for the above recited purpose is selected from the range 0.1% to 5.0% by weight of the composition. A preferred proportion is selected from the range 0.3% to 0.7% by weight, a specially preferred proportion being about 0.5% by weight of the composition.

It has been found that an Ethyl cyanoacrylate solution containing 0.5% by weight Phthalic anhydride yields adhesive bonds having a heat resistant superior to that of bonds made with an otherwise identical composition containing 1.0% by weight Maleic anhydride in place of the Phthalic anhydride. Some of the bonds were formed between grit blasted steel lapshears, others between grit blasted aluminium lapshears. The bonds made with the invented composition were also found to possess significantly improved moisture resistance as compared with bonds made with the Maleic anhydride composition. It may be remarked that the Maleic anhydride composition is itself known to outperform a composition containing Ethyl cyanoacrylate alone, in both of the above mentioned respects.

It will be noted that various organic anhydrides have been proposed for the general purpose of the present invention. However none of the prior proposals known to us, either in the art cited aove or elsewhere, embraces the use of Phthalic anhydride. Some of the prior art goes so far as to exclude Phthalic anhydride specifically, indicating perhaps some misconception or prejudice prevalent in the art about the suitability of this compound. Hence the present invention may be said to rest on the surprising discovery of a hitherto unsuspected utility of Phthalic anhydride.

The invention will be appreciated in greater detail from the following examples of specific and preferred embodiments thereof. Each test result given in these examples is the mean of ten determinations.

EXAMPLE 1

Grit-blasted stainless steel strips 2.54 cm wide by circa 1 mm thick were prepared, aligned face to face, and adhesively secured together on an overlap length of 1.27 cm to give a bonded area of 3.22 $cm^2$. The bonds were allowed to cure at room temperature for 3 days, following which about one third of their number were tested. Half of the remaining number were thereupon subjected to ageing at 120° C. for 48 hours and tested. The other half of said remainder (one third of the original number of bonds) were subjected to ageing at 40° C. in conditions of 95% relative humidity for 7 days, after which they too were tested.

The tests were destructive measurements of the tensile shear strength of the adhesive bonds, the results being expressed in $kg/cm^2$, and (in parentheses) as a percentage of that initial strength which was determined after 3 days at room temperature. The procedure was carried out separately using three different adhesive compositions one of which was a composition of the invention, the other two being included for comparison. The polymerisable monomer of the composition in every case was Ethyl 2-cyanoacrylate. The results are set out in Table 1.

TABLE 1

| | Tensile shear strength $kg/cm^2$ | | |
|---|---|---|---|
| Additive | 3 days RT | + 48 hours 120° C. | + 7 days 40° C. 95% RH |
| 0.5% Phthalic anhydride | 155 | 109 (70%) | 130 (84%) |
| 1% Maleic anhydride | 178 | 110 (62%) | 85 (48%) |
| none | 158 | 59 (37%) | 88 (56%) |

EXAMPLE 2

The procedure of Example 1 was repeated, but using grit-blasted aluminium strips as the adhesive substrate in place of stainless steel. The results are set out in Table 2.

TABLE 2

| Additive | Tensile shear strength kg/cm² | | |
|---|---|---|---|
|  | 3 days RT | + 48 hours 120° C. | + 7 days 40° C. 95% RH |
| 0.5% Phthalic anhydride | 95 | 69 (73%) | 63 (66%) |
| 1% Maleic anhydride | 159 | 51 (32%) | 57 (36%) |
| none | 123 | 28 (23%) | 61 (50%) |

The utility of Phthalic anhydride is apparent from a comparison of its results with those where no additive was used. Its superiority to Maleic anhydride is likewise evident, though less pronounced in the case of stainless steel lapshears than in those of aluminium.

The adhesive compositions of the invention are found, additionally, to exhibit excellent stability in the unpolymerised state when stored for periods of three months or more. Thus they can be presented as one-part cyanoacrylic compositions without the known disadvantage associated with the use of Maleic anhydride. Maleic anhydride must, as a rule, be mixed into the Ethyl cyanoacrylate just prior to use. Storage of 1% Maleic anhydride in Ethyl cyanoacrylate leads to loss of the adhesive properties of the composition after about the third month, due to overstabilisation by Maleic acid resulting from in situ hydrolysis of the anhydride.

I claim:

1. An adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from said composition, under exposure to moisture or elevated temperature.

2. A composition according to claim 1 characterised in that the proportion of phthalic anhydride is selected from the range 0.1% to 5.0% by weight of the composition.

3. A composition according to claim 2 characterised in that the range is 0.3% to 0.7%.

4. A composition according to claim 3, characterised in that the proportion is about 0.5% by weight of the composition.

5. A composition according to one of claims 1–4 characterised in that the ester is ethyl 2-cyanoacrylate.

* * * * *